United States Patent
Grokop (10) Patent No.: US 9,124,981 B2
(45) Date of Patent: Sep. 1, 2015

(54) SYSTEMS AND METHODS FOR CLASSIFICATION OF AUDIO ENVIRONMENTS

(71) Applicant: QUALCOMM Incorporated, San Diego, CA (US)

(72) Inventor: Leonard Henry Grokop, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 310 days.

(21) Appl. No.: 13/785,775

(22) Filed: Mar. 5, 2013

(65) Prior Publication Data

US 2014/0133663 A1    May 15, 2014

Related U.S. Application Data

(60) Provisional application No. 61/726,493, filed on Nov. 14, 2012.

(51) Int. Cl.
*H04R 29/00*     (2006.01)
*H04M 1/725*     (2006.01)
*G10L 17/00*     (2013.01)
*G10L 15/065*    (2013.01)

(52) U.S. Cl.
CPC ............... *H04R 29/00* (2013.01); *G10L 17/00* (2013.01); *H04M 1/72569* (2013.01); *G10L 15/065* (2013.01)

(58) Field of Classification Search
CPC ...... H04R 29/00; G10L 15/065; G10L 17/00; H04M 1/72569

USPC ................................ 381/56, 58, 122; 704/217
See application file for complete search history.

(56) References Cited

U.S. PATENT DOCUMENTS

| 7,612,933 | B2 | 11/2009 | Djordjev |
| 2003/0045953 | A1* | 3/2003 | Weare ........................... 700/94 |
| 2010/0027820 | A1 | 2/2010 | Kates |
| 2011/0137656 | A1 | 6/2011 | Xiang et al. |
| 2011/0208722 | A1 | 8/2011 | Hannuksela |

(Continued)

FOREIGN PATENT DOCUMENTS

| EP | 2136358 A1 | 12/2009 |
| EP | 2264988 A1 | 12/2010 |
| EP | 2265988 A1 | 12/2010 |

(Continued)

OTHER PUBLICATIONS

International Search Report and Written Opinion—PCT/US2013/066889—ISA/EPO—Feb. 7, 2014.

(Continued)

*Primary Examiner* — Harry S Hong
(74) *Attorney, Agent, or Firm* — Hunter Clark PLLC (57) ABSTRACT

Systems and methods for classification of audio environments are disclosed. In one embodiment, a method of classifying an audio environment comprises sampling the audio environment to obtain sampled audio data in accordance with a first time interval, computing features of the sampled audio data, inferring an audio cluster identifier from the features of the sampled audio data in accordance with a second time interval, and updating an audio environment model using the features of the sampled audio data in accordance with a third time interval.

32 Claims, 9 Drawing Sheets

(56) References Cited

U.S. PATENT DOCUMENTS

2011/0295607 A1 12/2011 Krishnan et al.
2014/0254808 A1* 9/2014 Park et al. ................ 381/56

FOREIGN PATENT DOCUMENTS

WO 2006132596 A1 12/2006
WO 2009120610 10/2009

OTHER PUBLICATIONS

International Preliminary Report on Patentability—PCT/US2013/066889, The International Bureau of WIPO—Geneva, Switzerland, Feb. 16, 2015, 37 pgs.

* cited by examiner

FIG. 8

SYSTEMS AND METHODS FOR CLASSIFICATION OF AUDIO ENVIRONMENTS

CROSS-REFERENCE TO RELATED ACTIONS

This application claims the benefit of U.S. Provisional Application No. 61/726,493, filed on Nov. 14, 2012, which is assigned to the assignee hereof, and expressly incorporated herein by reference.

FIELD

The present disclosure relates to the field of wireless communications. In particular, the present disclosure relates to systems and methods for classification of audio environments.

BACKGROUND

Low-power always-on audio environment classification may be envisioned as an enabler of context awareness applications for smartphones. While there have been attempts to facilitate supervised (i.e. pre-trained) audio classification, performance of such supervised audio classification may be mixed as the correct semantic label for a given ambient audio environment can often be user-specific. For example, the ambience of one person's home may sound like the ambience of another person's office. In addition, conventional audio classification methods can be computationally intensive, rendering such methods unsuitable for implementation in a low-power always-on manner. Another issue with conventional audio classification methods is the concern of privacy as the original audio samples may be stored.

SUMMARY

An example of a method of classifying an audio environment according to the disclosure includes sampling the audio environment to obtain sampled audio data in accordance with a first time interval, computing features of the sampled audio data, inferring an audio cluster identifier from the features of the sampled audio data in accordance with a second time interval, and updating an audio environment model using the features of the sampled audio data in accordance with a third time interval.

Implementations of the method may include one or more of the following features. Computing features of the sampled audio data may include computing a plurality of mel-frequency cepstral coefficients (MFCCs), generating running estimates of statistics of MFCC data over the first time interval using the plurality of MFCCs, and storing the running estimates of statistics of MFCC data. Generating running estimates of statistics of MFCC data may include adding the plurality of MFCCs to an estimate proportional to a mean of the plurality of MFCCs for the audio environment, and adding a square of the plurality of MFCCs to an estimate proportional to a variance of the plurality of MFCCs for the audio environment. Inferring the audio cluster identifier may include reading the running estimates of statistics of MFCC data, a previously stored audio environment model, and a previously determined audio environment probability distribution, computing a current audio environment probability distribution using the running estimates of statistics of MFCC data, the previously stored audio environment model, and the previously determined audio environment probability distribution, replacing the previously determined audio environment probability distribution with the current audio environment probability distribution, inferring a current audio cluster identifier in accordance with the current audio environment probability distribution, and storing the running estimates of statistics of MFCC data as MFCC statistics. Updating the audio environment model may include reading the MFCC statistics, updating the audio environment model using the MFCC statistics, and storing the audio environment model in a storage device. Sampling the audio environment can be performed for a duration between 20 to 30 milliseconds, inferring the audio cluster identifier can be performed for a duration between 1 to 100 milliseconds, and updating the audio environment model can be performed for a duration between 1 to 20 minutes. The first time interval can be substantially shorter than the second time interval, and the second time interval can be substantially shorter than the third time interval. The first time interval can be between 0.5 to 3 seconds, the second time interval can be between 30 to 120 seconds, and the third time interval can be between 6 to 24 hours. The audio cluster identifier can represent an ambient audio environment.

An example of an apparatus for classifying an audio environment according to the disclosure includes a memory unit, a processor programmed to: sample the audio environment to obtain sampled audio data in accordance with a first time interval, compute features of the sampled audio data, infer an audio cluster identifier from the features of the sampled audio data in accordance with a second time interval, such that the audio cluster identifier is stored in the memory unit, and update an audio environment model using the features of the sampled audio data in accordance with a third time interval.

Implementations of the apparatus may include one or more of the following features. The processor can be programmed to compute a plurality of mel-frequency cepstral coefficients (MFCCs), generate running estimates of statistics of MFCC data over the first time interval using the plurality of MFCCs, and store the running estimates of statistics of MFCC data in the memory module. The processor can be configured to add the plurality of MFCCs to an estimate proportional to a mean of the plurality of MFCCs for the audio environment, and add a square of the plurality of MFCCs to an estimate proportional to a variance of the plurality of MFCCs for the audio environment. The processor may also be configured to read the running estimates of statistics of MFCC data, a previously stored audio environment model, and a previously determined audio environment probability distribution, compute a current audio environment probability distribution using the running estimates of statistics of MFCC data, the previously stored audio environment model, and the previously determined audio environment probability distribution, replace the previously determined audio environment probability distribution with the current audio environment probability distribution, infer a current audio cluster identifier in accordance with the current audio environment probability distribution, and store the running estimates of statistics of MFCC data as MFCC statistics. The processor may also be programmed to read the MFCC statistics, update the audio environment model using the MFCC statistics, and store the audio environment model in the memory unit. The audio environment can be sampled for a duration between 20 to 30 milliseconds, the audio cluster identifier can be inferred in a duration between 1 to 100 milliseconds, and the audio environment model can be updated in a duration between 1 to 20 minutes. The first time interval can be substantially shorter than the second time interval, and the second time interval is substantially shorter than the third time interval. The processor can be programmed such that that first time interval is between 0.5 to 3 seconds, the second time interval is between 30 to 120 seconds, and the third time interval is between 6 to 24 hours. The processor can be programmed to indicate that the audio cluster identifier represents an ambient audio environment.

An example of a computer program product according to the disclosure resides on a processor-executable computer storage medium and includes processor-executable instructions configured to cause a processor to sample an audio environment to obtain sampled audio data in accordance with a first time interval, compute features of the sampled audio data, infer an audio cluster identifier from the features of the sampled audio data in accordance with a second time interval, and update an audio environment model using the features of the sampled audio data in accordance with a third time interval.

Implementations of the computer program product may include one or more of the following features. Instructions configured to cause the processor to compute a plurality of mel-frequency cepstral coefficients (MFCCs), generate running estimates of statistics of MFCC data over the first time interval using the plurality of MFCCs, and store the running estimates of statistics of MFCC data in the memory module. Instructions configured to cause the processor to add the plurality of MFCCs to an estimate proportional to a mean of the plurality of MFCCs for the audio environment, and add a square of the plurality of MFCCs to an estimate proportional to a variance of the plurality of MFCCs for the audio environment. Instructions configured to cause the processor to read the running estimates of statistics of MFCC data, a previously stored audio environment model, and a previously determined audio environment probability distribution, compute a current audio environment probability distribution using the running estimates of statistics of MFCC data, the previously stored audio environment model, and the previously determined audio environment probability distribution, replace the previously determined audio environment probability distribution with the current audio environment probability distribution, infer a current audio cluster identifier in accordance with the current audio environment probability distribution, and store the running estimates of statistics of MFCC data as MFCC statistics. Instructions configured to cause the processor to read the MFCC statistics, update the audio environment model using the MFCC statistics, and store the audio environment model. Instructions configured to cause the processor to sample the audio environment for a duration between 20 to 30 milliseconds, infer the audio cluster identifier for a duration between 1 to 100 milliseconds, and update the audio environment model for a duration between 1 to 20 minutes. Instructions indicating that the first time interval is substantially shorter than the second time interval, and the second time interval is substantially shorter than the third time interval. Instructions to indicate that the first time interval is between 0.5 to 3 seconds, the second time interval is between 30 to 120 seconds, and the third time interval is between 6 to 24 hours. Instructions to cause the processor to infer the audio cluster identifier which can represent an ambient audio environment.

An example of an apparatus for classifying an audio environment with a mobile device according to the disclosure includes means for sampling the audio environment to obtain sampled audio data in accordance with a first time interval, means for computing features of the sampled audio data, means for inferring an audio cluster identifier from the features of the sampled audio data in accordance with a second time interval, and means for updating an audio environment model using the features of the sampled audio data in accordance with a third time interval.

Implementations of the apparatus may include one or more of the following features. Means for computing a plurality of mel-frequency cepstral coefficients (MFCCs), means for generating running estimates of statistics of MFCC data over the first time interval using the plurality of MFCCs, and means for storing the running estimates of statistics of MFCC data. The means for generating running estimates of statistics of MFCC data can include means for adding the plurality of MFCCs to an estimate proportional to a mean of the plurality of MFCCs for the audio environment, and means for adding a square of the plurality of MFCCs to an estimate proportional to a variance of the plurality of MFCCs for the audio environment. The means for inferring the audio cluster identifier can include means for reading the running estimates of statistics of MFCC data, a previously stored audio environment model, and a previously determined audio environment probability distribution, means for computing a current audio environment probability distribution using the running estimates of statistics of MFCC data, the previously stored audio environment model, and the previously determined audio environment probability distribution, means for replacing the previously determined audio environment probability distribution with the current audio environment probability distribution, means for inferring a current audio cluster identifier in accordance with the current audio environment probability distribution, and means for storing the running estimates of statistics of MFCC data as MFCC statistics. The means for updating the audio environment model can include means for reading the MFCC statistics, means for updating the audio environment model using the MFCC statistics, and means for storing the audio environment model in a storage device. Sampling the audio environment can be performed for a duration between 20 to 30 milliseconds, inferring the audio cluster identifier can be performed for a duration between 1 to 100 milliseconds, and updating the audio environment model can be performed for a duration between 1 to 20 minutes. In general, the first time interval is substantially shorter than the second time interval, and the second time interval is substantially shorter than the third time interval. The first time interval can be between 0.5 to 3 seconds, the second time interval can be between 30 to 120 seconds, and the third time interval can be between 6 to 24 hours.

Items and/or techniques described herein may provide one or more of the following capabilities, as well as other capabilities no mentioned. Audio data captured by a user's smartphone can be clustered into distinct ambient environments. Privacy of the user can be maintained because captured audio clips do not need to be stored. Three independent services can be executed on different time scales and duty cycled to conserve power. A feature computation service can operate on a time scale of seconds. An inference service/engine can operate on a time scale of minutes. A model update service can operate on a scale of hours or days. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

DESCRIPTION OF EMBODIMENTS

Embodiments of classifying audio environments are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein.

Figure 1:
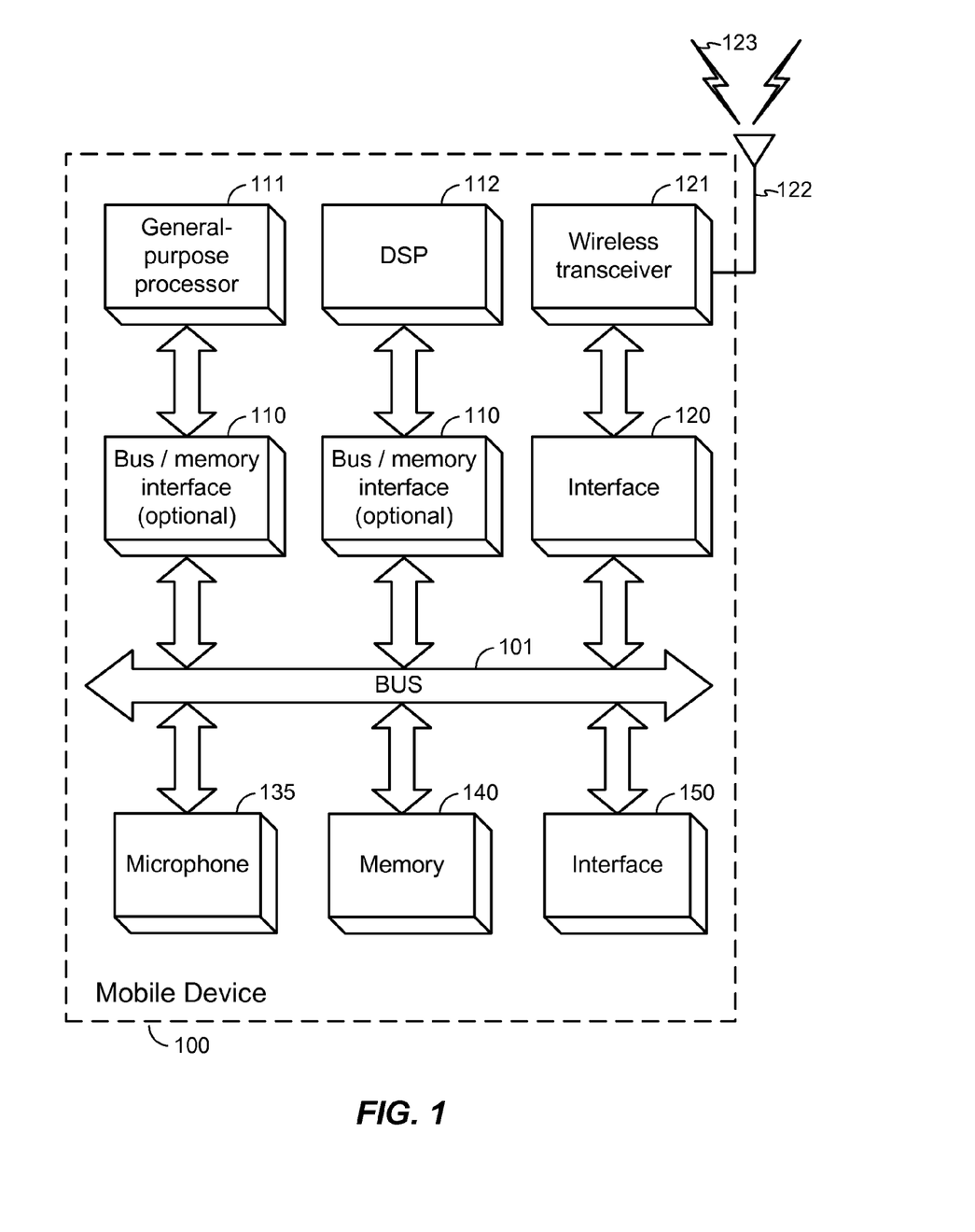
FIG. 1 is a block diagram of components of a mobile computing device.

Referring to FIG. 1, an example mobile device 100 includes a wireless transceiver 121 that sends and receives wireless signals 123 via a wireless antenna 122 over a wireless network. The transceiver 121 is connected to a bus 101 by a wireless transceiver bus interface 120. While shown as distinct components in FIG. 1, the wireless transceiver bus interface 120 may also be a part of the wireless transceiver 121. Here, the mobile device 100 is illustrated as having a single wireless transceiver 121. However, a mobile device 100 can alternatively have multiple wireless transceivers 121 and wireless antennas 122 to support multiple communication standards such as WiFi, Code Division Multiple Access (CDMA), Wideband CDMA (WCDMA), Long Term Evolution (LTE), Bluetooth, etc.

A general-purpose processor 111, memory 140, digital signal processor (DSP) 112 and/or specialized processor(s) (not shown) may also be utilized to process the wireless signals 123, or audio input signals, in whole or in part. Storage of information from the wireless signals 123 is performed using a memory 140 or registers (not shown). While only one general purpose processor 111, DSP 112 and memory 140 are shown in FIG. 1, more than one of any of these components could be used by the mobile device 100. The general purpose processor 111 and DSP 112 are connected to the bus 101, either directly or by a bus interface 110. Additionally, the memory 140 is connected to the bus 101 either directly or by a bus interface 150. The bus interfaces 110, when implemented, can be integrated with or independent of the general-purpose processor 111, DSP 112 and/or memory 140 with which they are associated.

The memory 140 includes a non-transitory computer-readable storage medium (or media) that stores functions as one or more instructions or code. Media that can make up the memory 140 include, but are not limited to, RAM, ROM, FLASH, disc drives, etc. Functions stored by the memory 140 are executed by the general-purpose processor 111, specialized processor(s), or DSP 112. Thus, the memory 140 is a processor-readable memory and/or a computer-readable memory that stores software code (programming code, instructions, etc.) configured to cause the processor 111 and/or DSP 112 to perform the functions described. Alternatively, one or more functions of the mobile device 100 may be performed in whole or in part in hardware.

The mobile device 100 further includes a microphone 135 that captures ambient audio in the vicinity of the mobile device 100. While the mobile device 100 here includes one microphone 135, multiple microphones 135 could be used, such as a microphone array, a dual-channel stereo microphone, etc. Multiple microphones 135, if implemented by the mobile device 100, can operate interdependently or independently of one another. The microphone 135 is connected to the bus 101, either independently or through a bus interface 110. For instance, the microphone 135 can communicate with the DSP 112 through the bus 101 in order to process audio captured by the microphone 135. The microphone 135 can additionally communicate with the general-purpose processor 111 and/or memory 140 to generate or otherwise obtain metadata associated with captured audio.

Figure 2A:
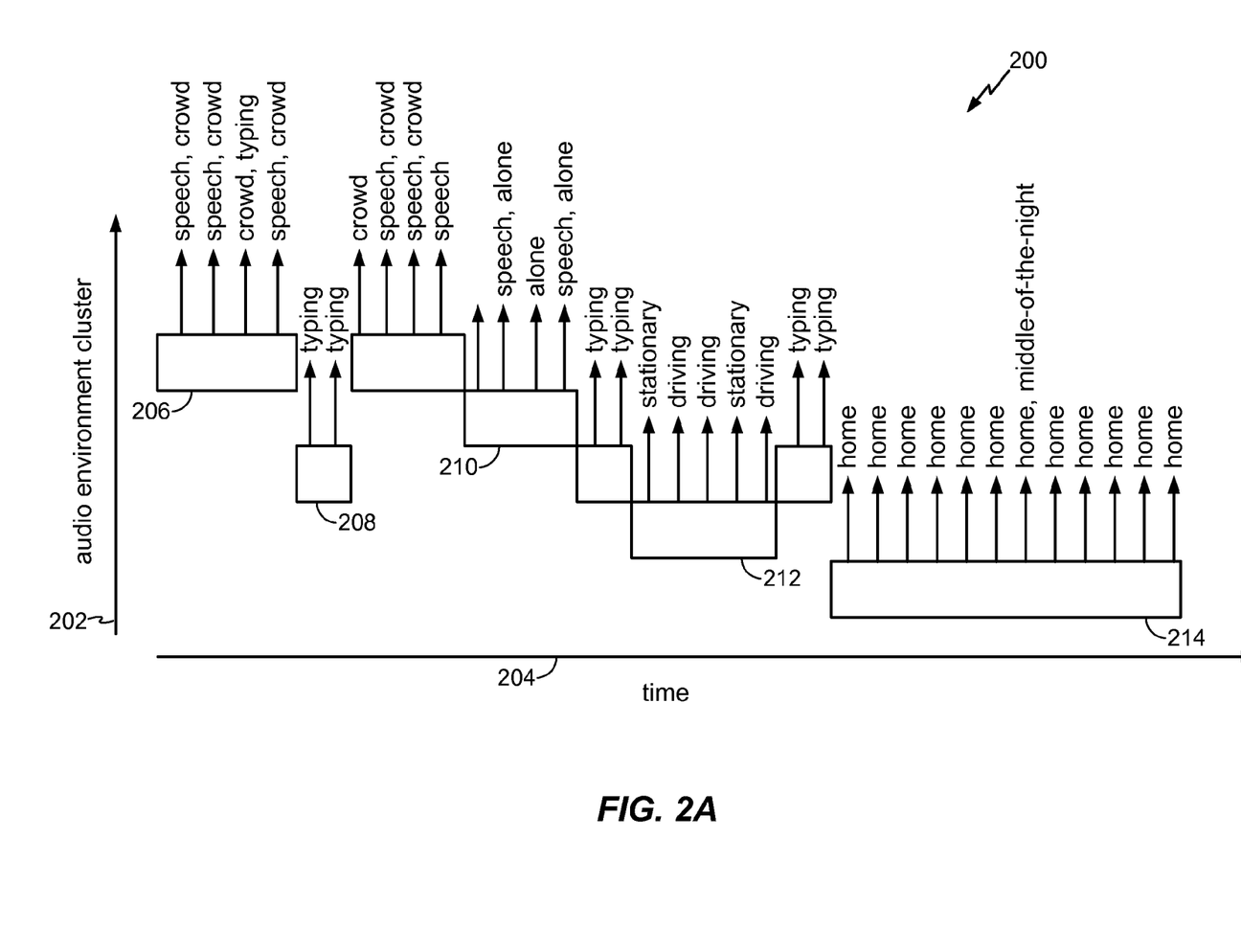
FIGS. 2A and 2B illustrate exemplary classifications of audio environments according to some aspects of the present disclosure.

Referring to FIG. 2A, an exemplary classifications of audio environments 200 is shown. The audio environment clusters can represent the different locations and activities that transpire around the mobile device 100. A primary example is inferring an audio environment cluster based on the sounds detected via the microphone 135. Other sensors such as accelerometers, light detectors, and location determination functions may be used to help infer an audio environment cluster. The first exemplary classification 200 includes a vertical axis 202 to represent an audio environment cluster and a horizontal axis 204 to represent time. The disclosed systems and methods may infer situations based on audio environments by aggregating inferences such as speech, crowd, alone, typing, time of day, motion state, and other relevant audio inferences. In this example, the inferred situations may include meeting cluster 206, landline phone cluster 208, working alone cluster 210, driving cluster 212, and sleeping cluster 214. Note that the method of situation inference may be used to enhance motion-based drive detection by aggregating driving inferences over appropriate time period.

Figure 2B:
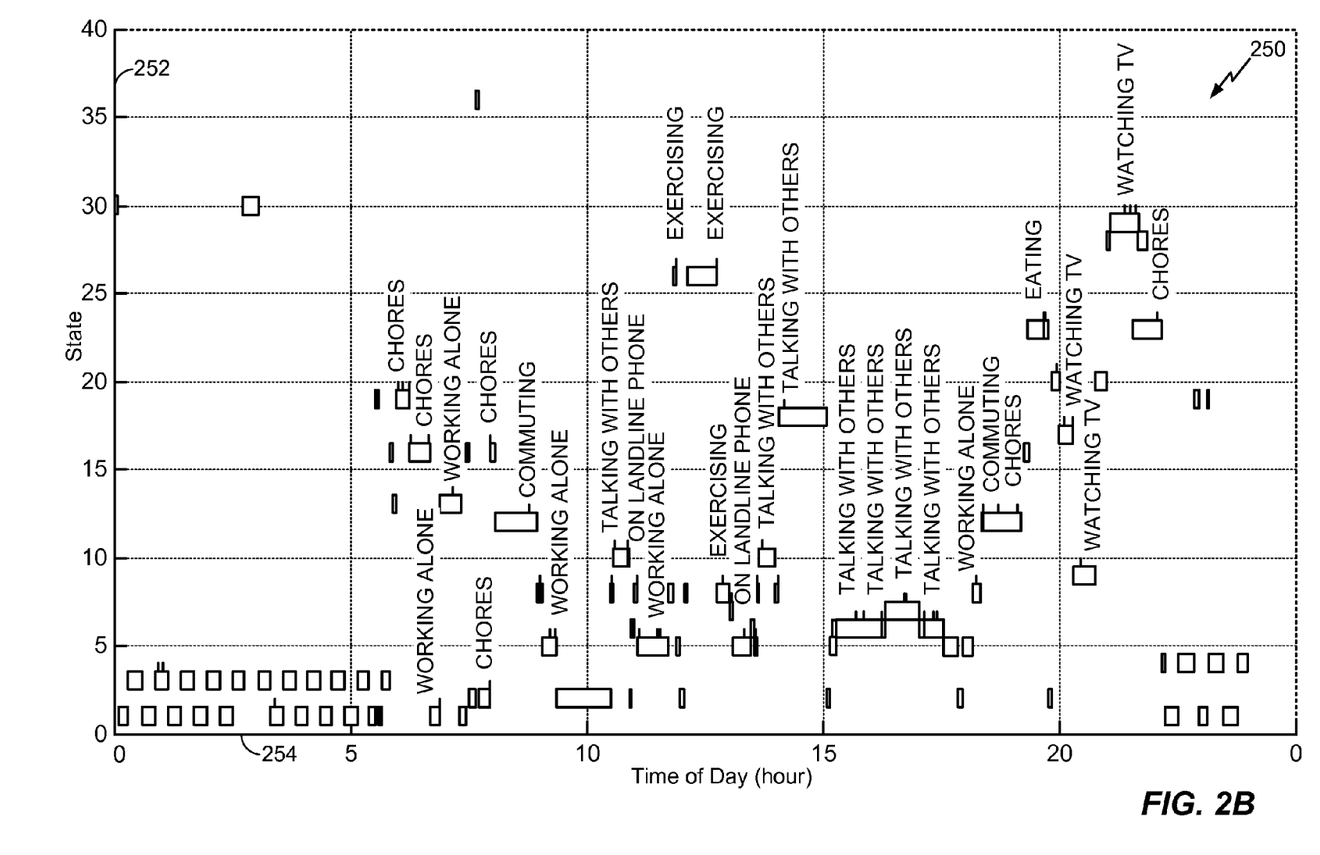

Referring to FIG. 2B, an exemplary classifications of audio environments based on the time of date 250 is shown. In an embodiment, a mobile device 100 can detect an audio environment over the course of a day. The results of a detection event can be compared to a previously stored model and activity labels can be inferred. In the classification chart 250, the vertical axis 252 represents state and the horizontal axis 254 represents time of day. The example classification can be inferred based on previously stored models. As an example, and not a limitation, the model includes activity labels for situations that may be inferred, including a chores cluster, working alone cluster, commuting cluster, on landline phone cluster, exercising cluster, talking with others cluster, eating cluster, and watching TV cluster. Other clusters may also be inferred, and models may be expanded to include more activity labels based on a user's activity and the corresponding acoustic, and possibly other sensory, input.

Figure 3:
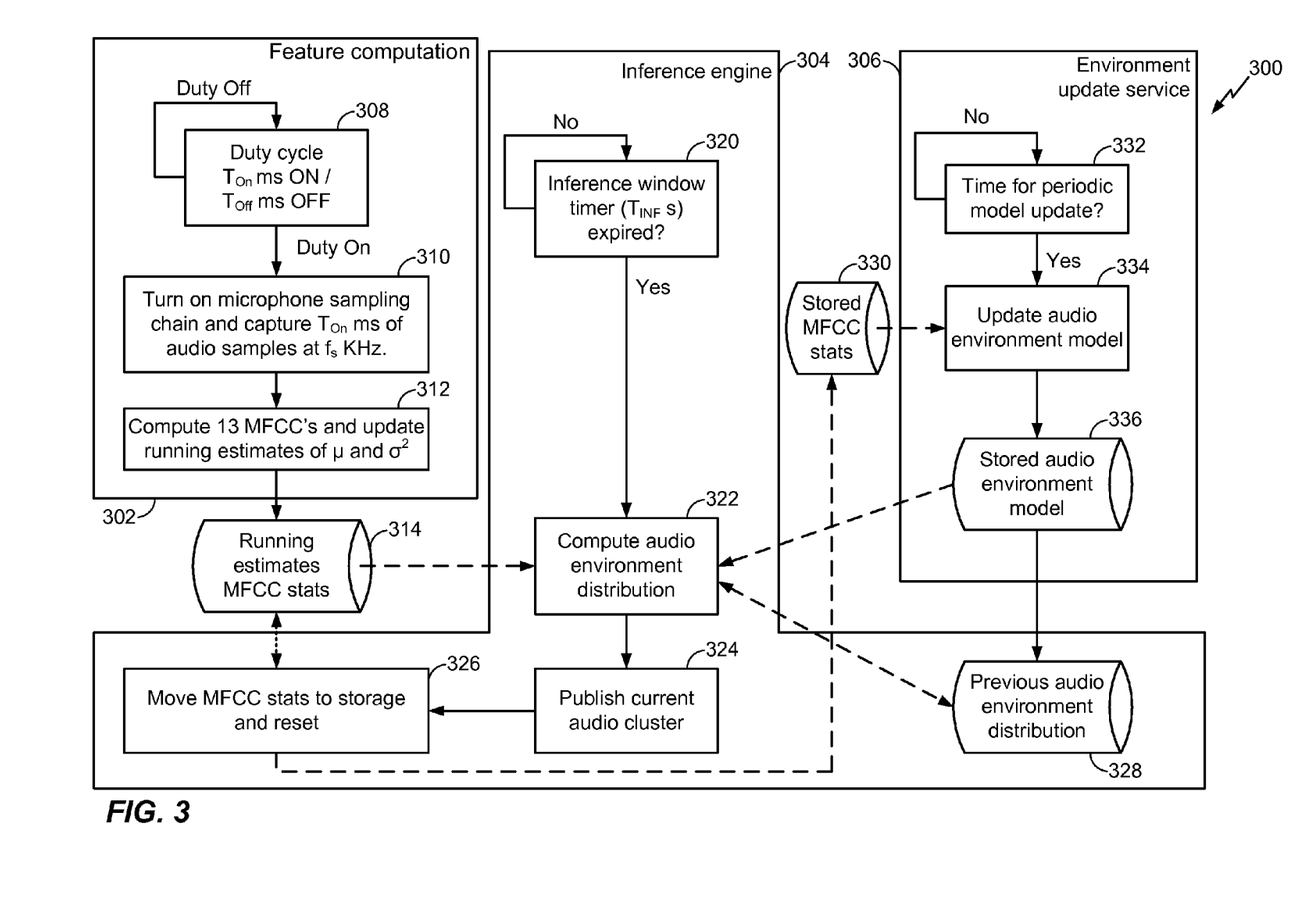
FIG. 3 is an exemplary flow chart showing a method of classifying an audio environment according to some aspects of the present disclosure.

Referring to FIG. 3, an exemplary flow chart of a method 300 of classifying an audio environment using a mobile device 100 is shown. The method 300, however, is exemplary only and not limiting. The method 300 may be altered, e.g., by having stages added, removed, or rearranged.

In an embodiment, the method 300 protects a user's privacy in that the original samples of the ambient audio environment do not persist in a long term memory. The method 300 can also enable a low-power always-on implementation through features such as duty-cycled audio sampling and feature computation, characterization of the current ambient audio environment in terms of a small number of sufficient statistics, waking the processor for brief periods to perform audio inference, and performing computationally intensive model updates infrequently and opportunistically, for example when the device is charging.

According to aspects of the present disclosure, the method includes using the processor 111 to run three services, namely a feature computation service 302, an inference engine 304, and an audio model environment update service 306. Note that each service may be performed in a duty-cycled manner to minimize power consumption. Each service may operate on a different time scale.

In one exemplary implementation, the feature computation service 302 operates on the time scale of seconds. At stage 308, the processor 111 on the mobile device 100 can execute instructions to activate the audio receive chain for a duty cycle. As an example, the duty cycle (e.g., $T_{ON}+T_{OFF}$) includes a duty on (e.g., $T_{ON}$) status with a duration of approximately in range of 500 to 3000 milliseconds (ms). When the audio chain is activated during a duty on period, at stage 310 the service 302 can instruct the mobile device to turn on the audio sub-system which may include the microphone 135 and processor(s), and samples about 20 to 30 ms of audio data. In an example, the sampling frequency ($f_s$) is approximately 16 Hz.

At stage 312, the processor 111 and DSP 112 can compute 13 Mel-Frequency Cepstral Coefficients (MFCCs). In an example, the MFCCs are based on a 30 ms audio frame. The MFCC statistics are then updated (e.g., mean and variances) and stored at stage 314. Typically, the memory used for the running estimates at stage 314 is volatile memory. For example, comparison service 302 adds the MFCC statistic values to a running estimate of the mean of the MFCCs for the current audio environment, and adds the square of these values to a running estimate of the variance of the MFCCs for the current audio environment. These values typically require 2 bytes of memory per MFCC, with a total of 26 B for the mean value and 26 B for the variance. Thus the total memory used is 52 B. The audio-subsystem may then be idle or asleep for the remaining time (approx. 965-975 ms) each second.

In an embodiment, the Inference Engine 304 operates on the time scale of minutes. At stage 320, the processor 111 is configured to wake up the relevant resources (e.g., DSP 112, memory 140, specialized processors). A typical interface window timer ($T_{INF}$) will expire every 30-120 seconds. When the timer is expired, at stage 322, the engine 304 includes instruction to read from memory the running estimates of the mean and variance of the MFCCs from stage 314, the stored audio environment model from stage 336, and the previous audio environment distribution from stage 328. The engine 304 then computes a new audio environment distribution using a forward algorithm for Hidden Markov Models (HMMs). The previous audio environment distribution is then replaced with a new one at stage 328. At stage 324, the engine 304 publishes the state with the highest probability as the current audio cluster. At stage 326, the engine 304 copies the running estimates of the mean and variance to storage in non-volatile memory at stage 330 and resets the running estimates at stage 314 to zero. In an embodiment, these operations may take approximately on the order of 5 ms. The engine 304 may then go back to sleep for the remainder of the interface window interval.

In general, the audio model environment update service 306 operates on the time scales of hours or days. At stage 332, the update service 306 wakes up the relevant processor(s) (e.g., processor 111, DSP 112, specialized processors). As an example, and not a limitation, the time for a periodic model update occurs once a day when the mobile device 100 is plugged in, preferably after midnight. Once the update is triggered, at stage 334 the update service 306 loads the stored MFCC data (i.e. stored running estimates at stage 330), and performs computations to update the audio environment model. When this computation has completed, the stored audio environment model may be updated at stage 336, and the relevant processors can be put back to sleep. In an example, the update audio model operation at stage 334 may take on the order of approximately 1 to 2 minutes to execute.

In an embodiment, the audio model environment update service 306 is performed by a remote server that is connected to the mobile device 100 via a network. For example, the remote server can be on a Wide Area Network (e.g., cellular network) that is accessible via a wireless communication link. The remote server may also be accessible via a Femto cell or other network access point.

According to aspects of the present disclosure, the audio environment model update service 306 clusters the stored MFCC data. The data includes one mean value and one variance value for each of the 13 MFCCs, for each minute. The stored mean and variance data points for the $d^{th}$ MFCC in the $t^{th}$ minute are denoted by yS(d, t) and yS2(d, t), respectively. The clustering operation learns both the number of distinct audio environments the user frequents and the parameters that characterize these distinct audio environments. These learned values constitute the updated audio environment model.

Temporal information, and other sensory input, can be included in the clustering operation as such information may improve performance. In this approach, assigning two hidden states to the same cluster may be favored if they occur close together in time, or have similar sensory input information.

Figure 4:
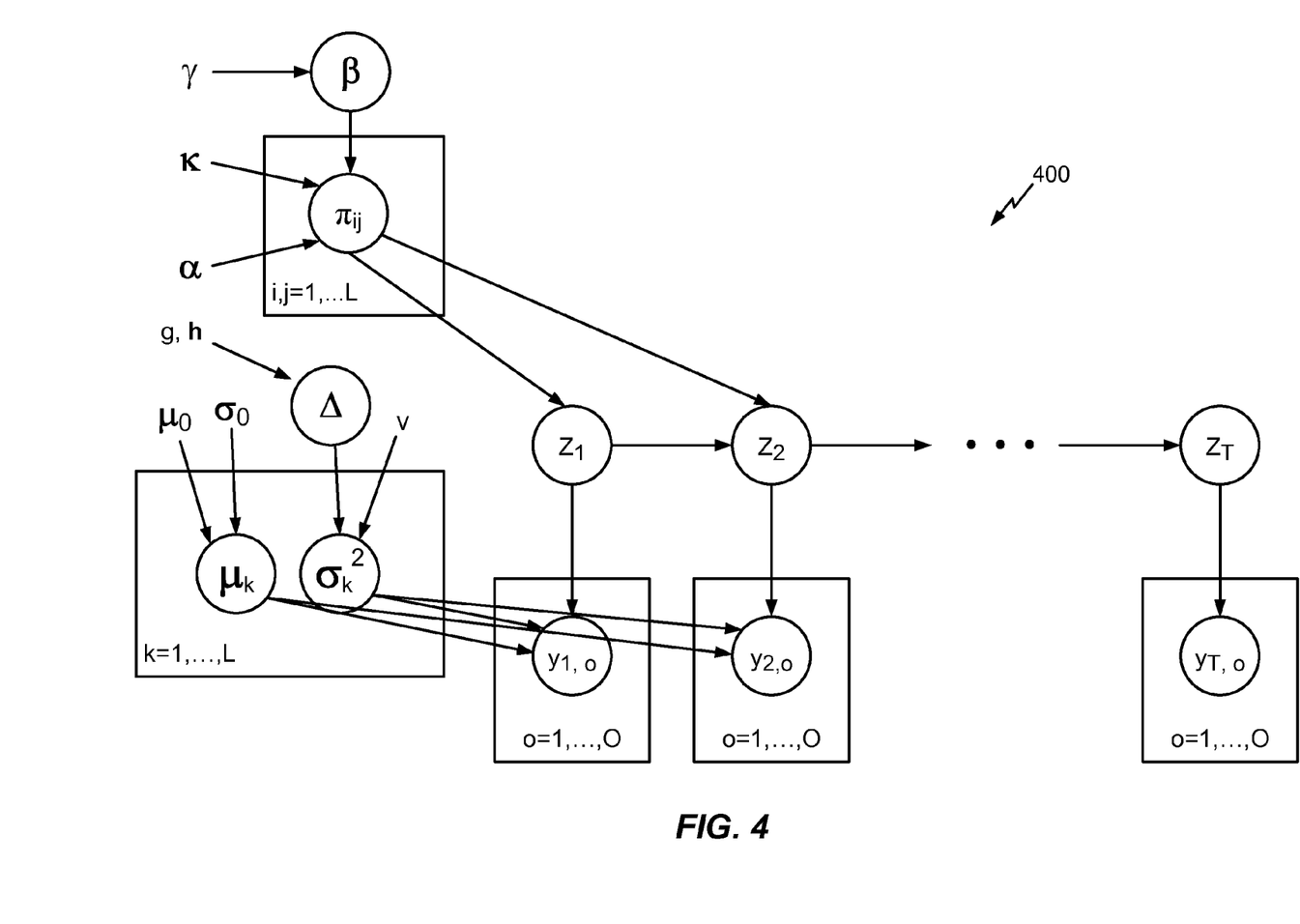
FIG. 4 illustrates an exemplary model used to cluster audio environment data according to some aspects of the present disclosure.

Referring to FIG. 4, an exemplary model 400 used to cluster audio environment data is shown. In one implementation, it is assumed that the data is generated according to a particular statistical model, from and the most likely parameters of the model can be inferred from the given observations. In an example, the model can be a Bayesian non-parametric model which integrates statistical assumptions about the number of clusters hidden in the data.

Each cluster $k \in \{1, 2, \ldots, K\}$ in the model is parameterized by a mean vector $\mu_k = [\mu_k(1), \ldots, \mu_k(13)]$ and a variance vector $\sigma_k^2 = [\sigma_k^2(1), \ldots, \sigma_k^2(13)]$. The total number of clusters discovered is denoted K.

The clustering outputs K, $\mu_1, \ldots, \mu_K, \sigma_1^2, \ldots, \sigma_k^2$, and $\pi$, where $\pi$ is a matrix representing the transition probabilities between pairs of clusters (i.e. states). A model used for clustering is shown in FIG. 4. The model may initially be configured with a number of states L that is larger than the anticipated number of states. In one approach, the method chooses L>>K. In the model, $z_t$ represents the hidden cluster identifier of the audio environment during the $t^{th}$ minute of the day. The variable $y_{t,o} = [y_{1,t,o} \ldots y_{13,t,o}]$ represents the 13 dimensional MFCC feature vector computed from the raw audio data stream observed during the $t^{th}$ minute of the data. The variable O represents the number of feature vectors computed per minute. In another approach, the method uses O=60. The stored data encapsulates the MFCC feature vectors by the sufficient statistics $$yS(d,t)=\Sigma_{o=1}^{O} y_{d,t,o} \text{ and } yS2(d,t)=\Sigma_{o=1}^{O} y_{d,t,o}^2.$$

According to aspects of the present disclosure, the cluster identifier at a given point in time can be a function of the cluster identifier at the previous point in time, represented by the arrow connecting $z_{t-1}$ to $z_t$. The remaining variables represent the various parameters of the clustering model. FIG. 4 illustrates an exemplary model used to cluster audio environment data according to some aspects of the present disclosure.

According to some aspects of the present disclosure, the inference engine 304 uses a trained model comprises of parameters K, $\mu_1, \ldots, \mu_K, \sigma_1^2, \ldots, \sigma_K^2$, and $\pi$, together with the running estimates of the MFCC statistics yS(d,t) and yS2(d,t), and the previous audio environment distribution $p_{old}=[p_{old}(1), \ldots p_{old}(K)]$, to infer a new audio environment distribution $p_{new}=[p_{new}(1), \ldots p_{new}(K)]$ and output the identifier of most probable state from this distribution as an integer from the set $\{1, \ldots, K\}$. For example, the $t^{th}$ minute may be done as follows.

$$p_{new}(k) = b(k) \sum_{j=1}^{K} \pi(i,j) p_{old}(j)$$

where $$b(k) = \left(\prod_{d=1}^{13} \sigma_k^2(d)\right)^{-O/2} \cdot \exp\left(\sum_{d=1}^{13} \frac{yS2(d,t) - 2yS(d,t) \cdot \mu_k(d) + O \cdot \mu_k(d)^2}{2\sigma_k(d)^2}\right)$$

The computation of b is usually performed in the log-domain.

In one implementation, an example of the efficacy of this audio environment clustering method on the data of a user is shown in FIG. 2B. The x-axis shows time of a day in hours. The y-axis shows inferred cluster identifier based on training the model using 2 weeks of prior data from the same user. Activity labels are illustrated on the plot at the times as provided by the user.

Figure 5:
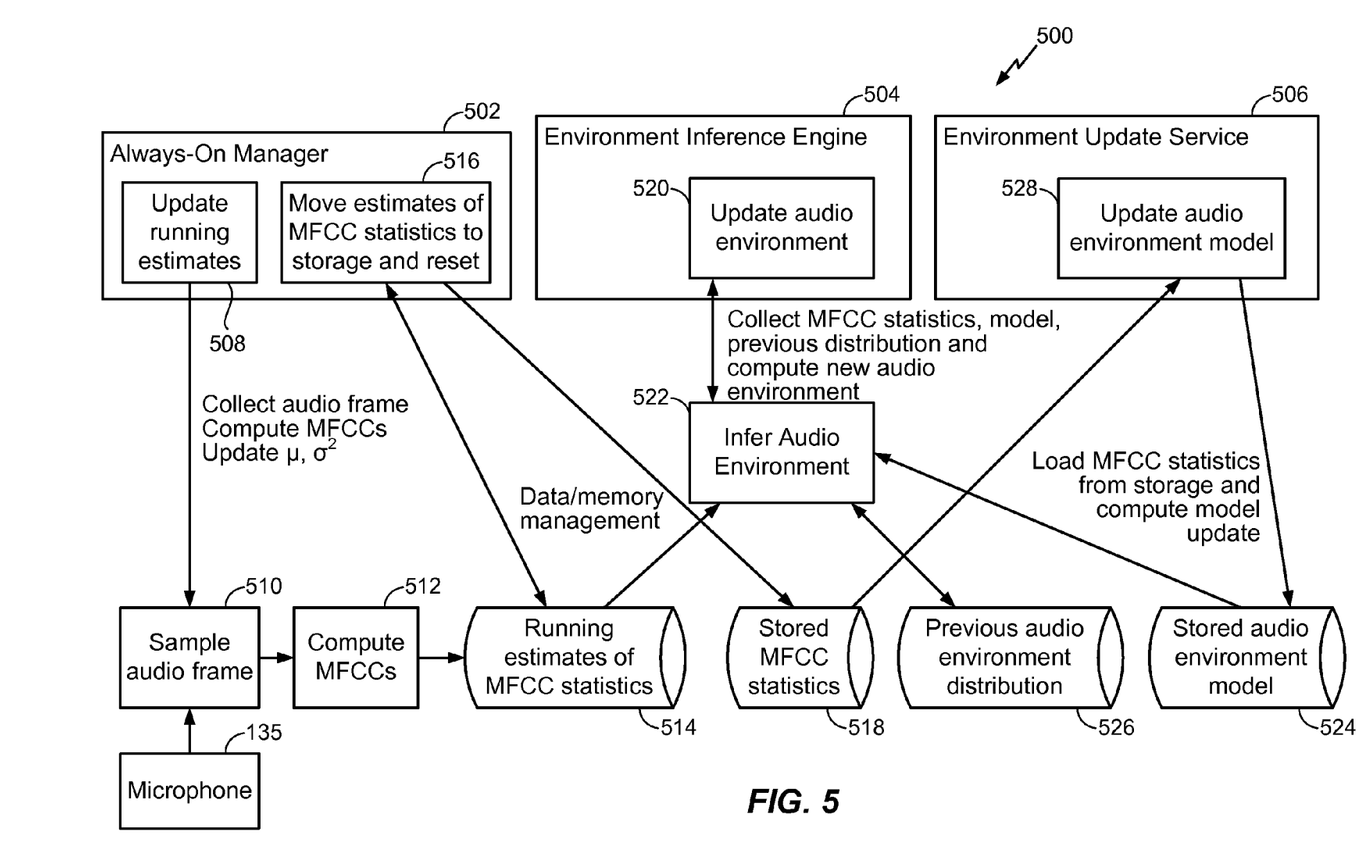
FIG. 5 is another exemplary flow chart showing a process of classifying an audio environment according to some aspects of the present disclosure.

Referring to FIG. 5, with further reference to FIG. 3, a process 500 for classifying an audio environment using a mobile device 100 is shown. In general, the process 500 can be enabled through computer-readable instructions stored in memory 140 that are configured to instruct the components of the mobile device 100 to perform the identified tasks. The process 500, however, is exemplary only and not limiting. The process 500 may be altered, e.g., by having stages added, removed, or rearranged. In an embodiment, one or more stages of the process 500 can be performed by a remote computer that is connected to the mobile device 100 via a network.

At stage 502, the mobile device 100 includes an Always-On Manager code segment including computer-readable instructions configured to instruct the processor(s) (e.g., the processor 111 and other special purpose processors if required) and the DSP 112 to update the running estimates of the MFCC statistics. At stage 508, the Always-On Manager 502 can instruct the mobile device 100 to collect audio frame data, compute MFCCs and update the MFCC statistics (i.e., mean and variance). For example, the Always-On Manager 502 instructs the mobile device 100 to turn on the audio subsystem including the microphone 135 and other elements of the audio receive chain (e.g., DSP 112, memory 140, processor(s)). The instruction to turn on the audio subsystem can occur on a scale of seconds (e.g., each 0.5, 1, 1.5, 2, 3 seconds). At stage 510, the mobile device 100 collects audio frame information via the microphone 135, and samples 20-30 ms of the audio data. At stage 512, a number of MFCC are computed. For example, 13 MFCC are computed and at stage 514 the values are added to a running estimate of the mean of the MFCCs for the current audio environment, and the square of these values is added to a running estimate of the variance of the MFCCs for the current audio environment.

At stage 516, the Always-On Manger 502 code segment includes instructions for causing the processor(s) to perform data/memory management functions. For example, Always-On Manager 502 includes instructions to move the estimates of the MFCC statistics to storage at stage 518 and reset the running estimates to zero at stage 514. In example, the Always-On manager 502 preforms the functions of stage 516 in coordination with the Environment Inference Engine 504.

At stage 504, the mobile device 100 includes an Environment Inference Engine code segment including computer-readable instructions configured to instruct the processor(s) and the DSP 112 to update an audio environment. In general, the Environment Inference Engine 504 executes on a time scale of minutes (e.g., each 1, 1.5, 2, 3 mins). At stage 520, the Environment Inference Engine 504 provides instruction to collect MFCC statistics (i.e., from stage 514), the stored audio environment model (i.e., from stage 524), and the previous audio environment distribution (i.e., from stage 526). At stage 522, the Environment Inference Engine 504 uses the collected information to infer an audio environment. For example, the infer audio environment stage 522 uses the forward algorithm for HMMs as previously described. Thus, each minute or so, the Environment Inference Engine 504 replaces the previous audio environment distribution at stage 526 with a new one. At stage 516, the running estimates of the MFCC statistics are copied to storage in a non-volatile memory (e.g., memory that is not erased when the mobile device 100 is shut down or power-cycled), and the running estimates at stage 514 are set to zero.

At stage 506, the mobile device 100 includes an Environment Update Service code segment including computer-readable instructions configured to load MFCC statistics from storage and compute a model update. In general, the Environment Update service executes on a time scale of days (e.g., every 1, 1.5, 2, 3 days). At stage 528, the processor 111 is instructed to load the stored MFCC data from stage 518 and perform a clustering operation on the MFCC data. For example, the clustering operation can be as previously described and depicted in FIG. 4. Due to the processing power required for the clustering operation, it is preferable to execute stage 528 when the mobile device is plugged in to a power source and not in use (e.g., in the middle of the night). As an example, and not a limitation, the operation may take on the order of 1-2 minutes to execute. In an embodiment, the stored MFCC statistics can be transferred over a network, and the processing at stage 528 can occur on a remote computer. The updated audio environment model can be stored in memory at stage 524.

Figure 6:
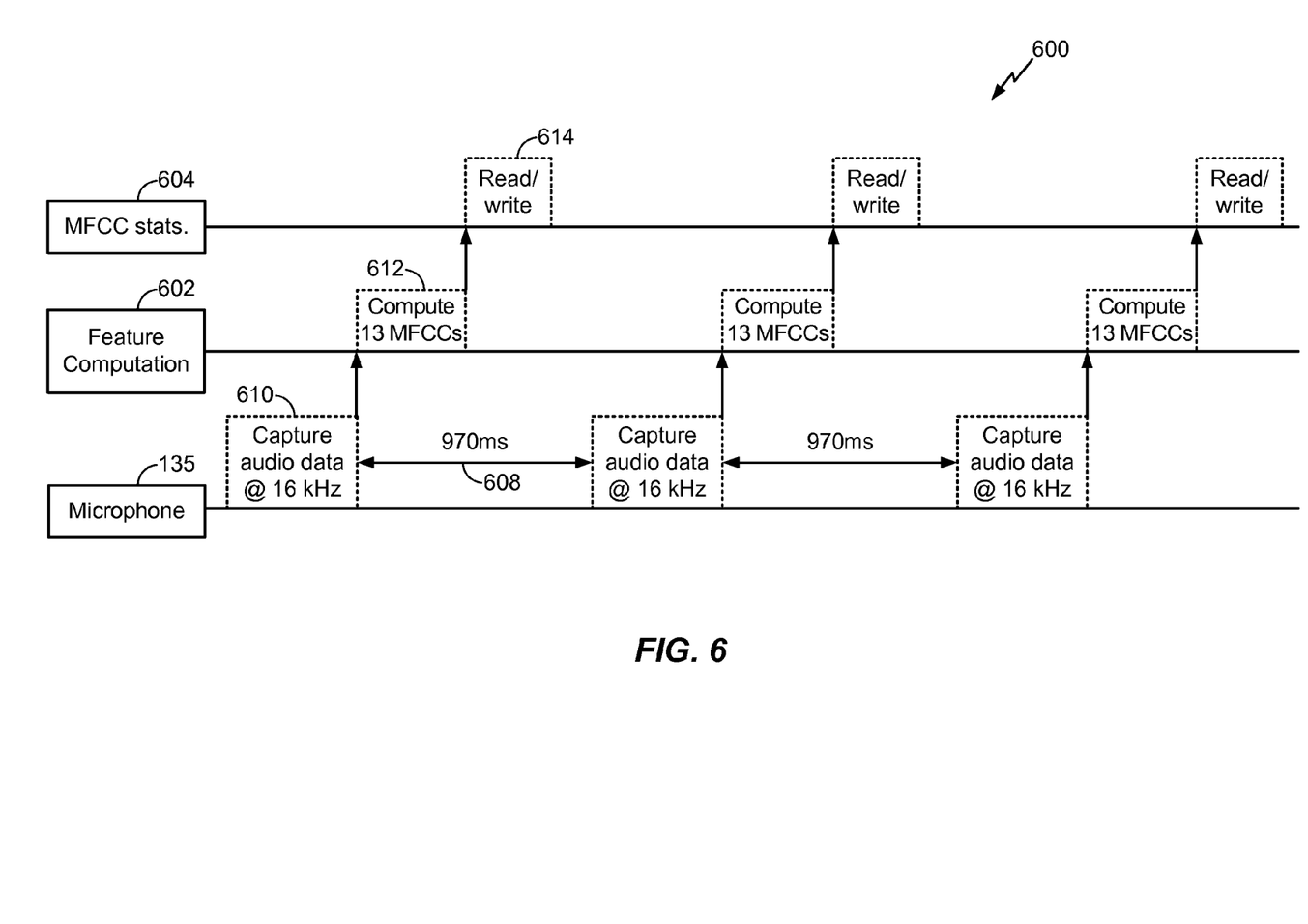
FIG. 6 illustrates an exemplary temporal mapping of data acquisition and feature computation according to some aspects of the present disclosure.

Referring to FIG. 6, with further reference to FIG. 3, an illustration 600 of an exemplary temporal mapping of data acquisition and feature computation is shown. The temporal mapping is exemplary only, and not a limitation, as other temporal configurations may be used. In general, the data acquisition and feature computation processes 302 operate in a scale measured in seconds. In an example, the mobile device 100 is configured to activate the microphone 135 to receive audio data. The duration of the audio capture 610 is typically in the range of 20-30 ms, and the sampling frequency is approximately 16 kHz. Other sampling duration and frequency combinations may be used. The feature computation module 602 receives the captured audio data and computes 13 MFCCs and estimates the MFCC statistics 604. The duration of this computation step 612 can vary based on processor speed, but it is typically in the range of 15-30 ms. The MFCC statistics 604 are then written to a volatile memory module within the mobile device 100. The processor and memory configuration can impact the read and write times, but duration of the read/write action 614 is typically 5-10 ms. The duration between the capture audio processes 608 is typically between 965-975 ms.

Figure 7:
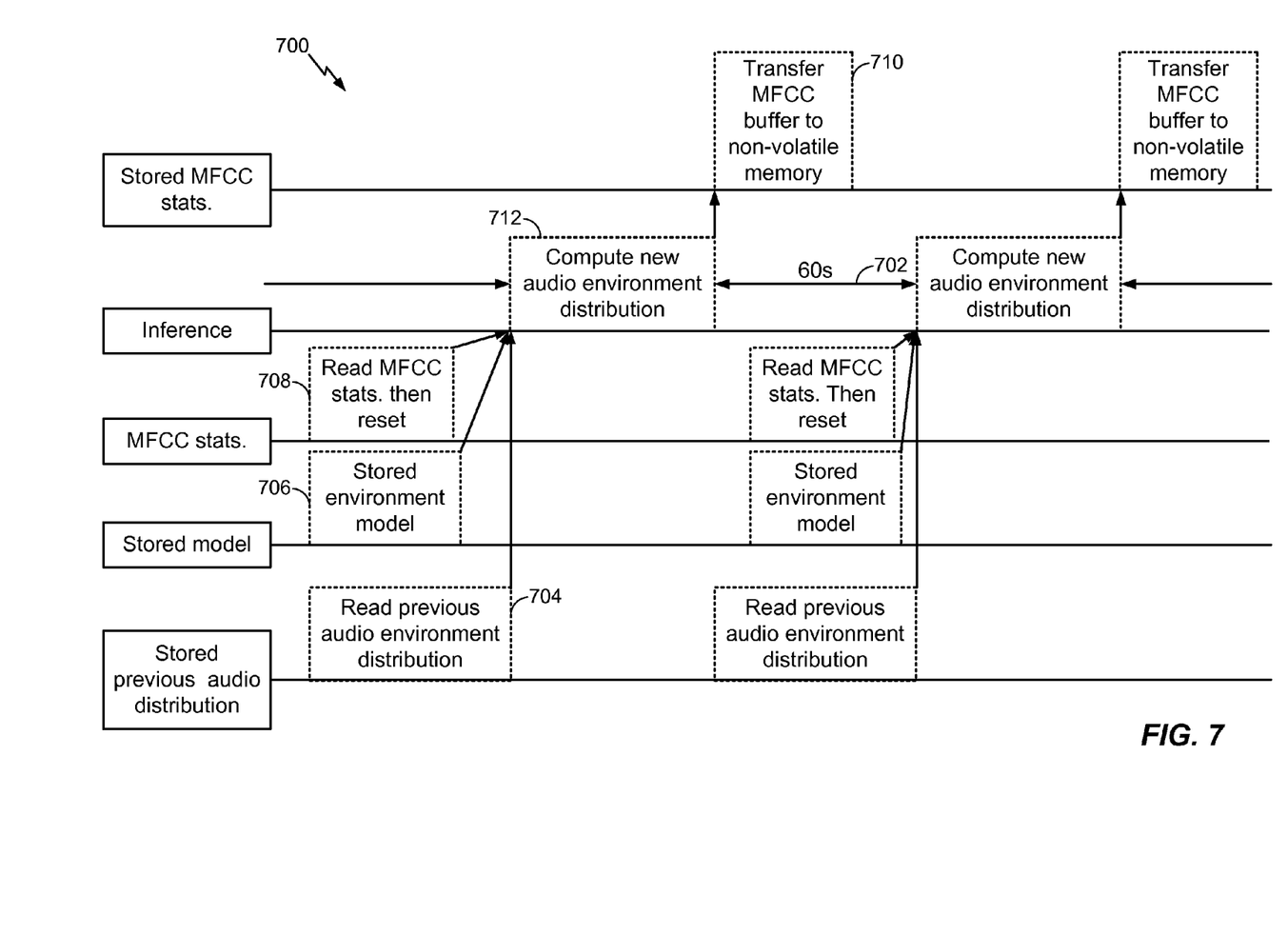
FIG. 7 illustrates an exemplary temporal mapping of environment inference according to some aspects of the present disclosure.

Referring to FIG. 7, with further reference to FIG. 3, an illustration 700 of an exemplary temporal mapping of environment inference is shown. The temporal mapping is exemplary only, and not a limitation, as other temporal configurations may be used. In general, the environmental inference engine 304 operates in a scale measured in minutes. In a typical example, the duration between computing new audio environment distributions 702 is approximately 60 seconds. The durations for the steps of reading previous audio environment distribution 704, receiving stored environment models 706, reading and resetting MFCC statistics 708, and transferring MFCC buffer to non-volatile memory 710 are exemplary only, and not a limitation. The time required for such memory access operations can depend on the memory and processor configurations. In general, the duration required to compute a new audio environment distribution 712 can be in the range of 2 milliseconds to 5 seconds.

Figure 8:
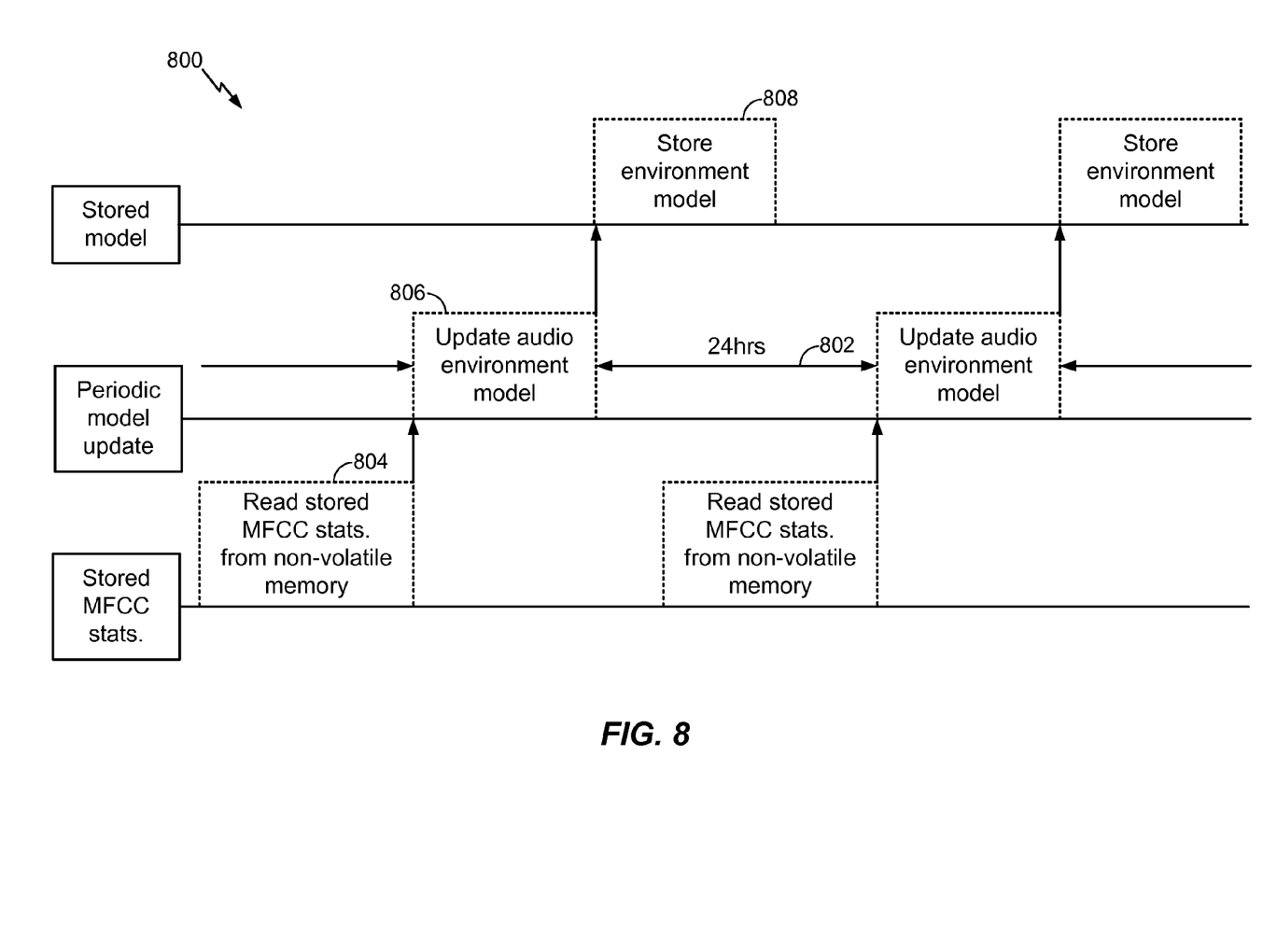
FIG. 8 illustrates an exemplary temporal mapping of updating audio environment model according to some aspects of the present disclosure.

Referring to FIG. 8, with further reference to FIG. 3, an illustration 800 of an exemplary temporal mapping of updating audio environment model is shown. The temporal mapping is exemplary only, and not a limitation, as other temporal configurations may be used. In general, the environmental update service 306 operates in a scale measured in hours or days. In a typical example, the duration between updating an audio environment model is approximately 24 hours (e.g., once a day). The durations of reading stored MFCC statistics from non-volatile memory 804, and storing environment models 808 are exemplary only, and not a limitation. The time required for such memory access operations can depend on the memory and processor configurations. In general, the duration required to compute and update an audio environmental model according to the disclosure is on the order 1-2 minutes.

The methodologies and mobile device described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause at least one processor to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

I claim:

1. A method of classifying an audio environment, comprising:
    sampling the audio environment with a microphone to obtain sampled audio data in accordance with a first time interval;
    computing features of the sampled audio data including computing a plurality of mel-frequency cepstral coefficients (MFCCs), generating running estimates of statistics of MFCC data over the first time interval using the plurality of MFCCs, storing the running estimates of statistics of MFCC data;
    inferring an audio cluster identifier from the features of the sampled audio data in accordance with a second time interval; and
    updating an audio environment model using the stored running estimates of statistics of MFCC data in accordance with a third time interval.

2. The method of claim 1, wherein generating running estimates of statistics of MFCC data comprises:
    adding the plurality of MFCCs to an estimate proportional to a mean of the plurality of MFCCs for the audio environment; and
    adding a square of the plurality of MFCCs to an estimate proportional to a variance of the plurality of MFCCs for the audio environment.

3. The method of claim 1, wherein inferring the audio cluster identifier comprises:
    reading the running estimates of statistics of MFCC data, a previously stored audio environment model, and a previously determined audio environment probability distribution;
    computing a current audio environment probability distribution using the running estimates of statistics of MFCC data, the previously stored audio environment model, and the previously determined audio environment probability distribution;
    replacing the previously determined audio environment probability distribution with the current audio environment probability distribution;
    inferring a current audio cluster identifier in accordance with the current audio environment probability distribution; and
    storing the running estimates of statistics of MFCC data as MFCC statistics.

4. The method of claim 3, wherein updating the audio environment model comprises:
    reading the MFCC statistics;
    updating the audio environment model using the MFCC statistics; and
    storing the audio environment model in a storage device.

5. The method of claim 1, wherein sampling the audio environment is performed for a duration between 20 to 30 milliseconds; wherein inferring the audio cluster identifier is performed for a duration between 1 to 100 milliseconds; and wherein updating the audio environment model is performed for a duration between 1 to 20 minutes.

6. The method of claim 1, wherein the first time interval is substantially shorter than the second time interval; and the second time interval is substantially shorter than the third time interval.

7. The method of claim 6, wherein the first time interval is between 0.5 to 3 seconds, the second time interval is between 30 to 120 seconds, and the third time interval is between 6 to 24 hours.

8. The method of claim 1, wherein the audio cluster identifier represents an ambient audio environment.

9. An apparatus for classifying an audio environment, comprising:
    a memory unit;
    a processor programmed to:
    sample the audio environment with a microphone to obtain sampled audio data in accordance with a first time interval;
    compute features of the sampled audio data including computing a plurality of mel-frequency cepstral coefficients (MFCCs), generating running estimates of statistics of MFCC data over the first time interval using the plurality of MFCCs, storing the running estimates of statistics of MFCC data in the memory unit;

infer an audio cluster identifier from the features of the sampled audio data in accordance with a second time interval, wherein the audio cluster identifier is stored in the memory unit; and update an audio environment model using stored running estimates of statistics of MFCC data in accordance with a third time interval.

10. The apparatus of claim 9, wherein the processor is further programmed to:

add the plurality of MFCCs to an estimate proportional to a mean of the plurality of MFCCs for the audio environment; and add a square of the plurality of MFCCs to an estimate proportional to a variance of the plurality of MFCCs for the audio environment.

11. The apparatus of claim 9, wherein the processor is further programmed to:

read the running estimates of statistics of MFCC data, a previously stored audio environment model, and a previously determined audio environment probability distribution;

compute a current audio environment probability distribution using the running estimates of statistics of MFCC data, the previously stored audio environment model, and the previously determined audio environment probability distribution;

replace the previously determined audio environment probability distribution with the current audio environment probability distribution;

infer a current audio cluster identifier in accordance with the current audio environment probability distribution; and store the running estimates of statistics of MFCC data as MFCC statistics.

12. The apparatus of claim 11, wherein the processor is further programmed to:

read the MFCC statistics;

update the audio environment model using the MFCC statistics; and store the audio environment model in the memory unit.

13. The apparatus of claim 9, wherein the processor is programmed to sample the audio environment for a duration between 20 to 30 milliseconds; infer the audio cluster identifier for a duration between 1 to 100 milliseconds; and update the audio environment model for a duration between 1 to 20 minutes.

14. The apparatus of claim 9, wherein the first time interval is substantially shorter than the second time interval; and the second time interval is substantially shorter than the third time interval.

15. The apparatus of claim 14, wherein the first time interval is between 0.5 to 3 seconds, the second time interval is between 30 to 120 seconds, and the third time interval is between 6 to 24 hours.

16. The apparatus of claim 9, wherein the audio cluster identifier represents an ambient audio environment.

17. A computer program product residing on a processor-executable computer storage medium, the computer program product comprising processor-executable instructions configured to cause a processor to:

sample an audio environment with a microphone to obtain sampled audio data in accordance with a first time interval;

compute features of the sampled audio data wherein the instructions are further configured to cause the processor to compute a plurality of mel-frequency cepstral coefficients (MFCCs), generate running estimates of statistics of MFCC data over the first time interval using the plurality of MFCCs, store the running estimates of statistics of MFCC data;

infer an audio cluster identifier from the stored running estimates of statistics of MFCC data in accordance with a second time interval; and update an audio environment model using the features of the sampled audio data in accordance with a third time interval.

18. The computer program product of claim 17, wherein instructions configured to cause the processor to generate running estimates of statistics of MFCC data comprise instructions configured to cause the processor to:

add the plurality of MFCCs to an estimate proportional to a mean of the plurality of MFCCs for the audio environment; and add a square of the plurality of MFCCs to an estimate proportional to a variance of the plurality of MFCCs for the audio environment.

19. The computer program product of claim 17, wherein instructions configured to cause the processor to infer the audio cluster identifier comprise instructions configured to cause the processor to:

read the running estimates of statistics of MFCC data, a previously stored audio environment model, and a previously determined audio environment probability distribution;

compute a current audio environment probability distribution using the running estimates of statistics of MFCC data, the previously stored audio environment model, and the previously determined audio environment probability distribution;

replace the previously determined audio environment probability distribution with the current audio environment probability distribution;

infer a current audio cluster identifier in accordance with the current audio environment probability distribution; and store the running estimates of statistics of MFCC data as MFCC statistics.

20. The computer program product of claim 19, wherein instructions configured to cause the processor to update the audio environment model comprise instructions configured to cause the processor to:

read the MFCC statistics;

update the audio environment model using the MFCC statistics; and store the audio environment model.

21. The computer program product of claim 17, comprising instructions configured to cause the processor to sample the audio environment for a duration between 20 to 30 milliseconds; infer the audio cluster identifier for a duration between 1 to 100 milliseconds;

and update the audio environment model for a duration between 1 to 20 minutes.

22. The computer program product of claim 17, comprising instructions indicating that the first time interval is substantially shorter than the second time interval; and the second time interval is substantially shorter than the third time interval.

23. The computer program product of claim 22, wherein instructions indicate that the first time interval is between 0.5 to 3 seconds, the second time interval is between 30 to 120 seconds, and the third time interval is between 6 to 24 hours.

24. The computer program product of claim 17, wherein instructions configured to cause the processor to infer the audio cluster identifier comprise instructions configured to cause the processor to infer the audio cluster identifier which represents an ambient audio environment.

25. An apparatus for classifying an audio environment with a mobile device, comprising:
- means for sampling the audio environment with a microphone to obtain sampled audio data in accordance with a first time interval;
- means for computing features of the sampled audio data including means for computer a plurality of mel-frequency cepstral coefficients (MFCCs), means for generating running estimates of statistics of MFCC data over the first time interval using the plurality of MFCCs, and means for storing the running estimates of statistics of MFCC data;
- means for inferring an audio cluster identifier from the features of the sampled audio data in accordance with a second time interval; and
- means for updating an audio environment model using the the stored running estimates of statistics of MFCC data in accordance with a third time interval.

26. The apparatus of claim 25, wherein the means for generating running estimates of statistics of MFCC data comprises:
- means for adding the plurality of MFCCs to an estimate proportional to a mean of the plurality of MFCCs for the audio environment; and
- means for adding a square of the plurality of MFCCs to an estimate proportional to a variance of the plurality of MFCCs for the audio environment.

27. The apparatus of claim 25, wherein the means for inferring the audio cluster identifier comprises:
- means for reading the running estimates of statistics of MFCC data, a previously stored audio environment model, and a previously determined audio environment probability distribution;
- means for computing a current audio environment probability distribution using the running estimates of statistics of MFCC data, the previously stored audio environment model, and the previously determined audio environment probability distribution;
- means for replacing the previously determined audio environment probability distribution with the current audio environment probability distribution;
- means for inferring a current audio cluster identifier in accordance with the current audio environment probability distribution; and
- means for storing the running estimates of statistics of MFCC data as MFCC statistics.

28. The apparatus of claim 27, wherein means for updating the audio environment model comprises:
- means for reading the MFCC statistics;
- means for updating the audio environment model using the MFCC statistics; and
- means for storing the audio environment model in a storage device.

29. The apparatus of claim 25, wherein sampling the audio environment is performed for a duration between 20 to 30 milliseconds; wherein inferring the audio cluster identifier is performed for a duration between 1 to 100 milliseconds; and wherein updating the audio environment model is performed for a duration between 1 to 20 minutes.

30. The apparatus of claim 25, wherein the first time interval is substantially shorter than the second time interval; and the second time interval is substantially shorter than the third time interval.

31. The apparatus of claim 30, wherein the first time interval is between 0.5 to 3 seconds, the second time interval is between 30 to 120 seconds, and the third time interval is between 6 to 24 hours.

32. The apparatus of claim 25, wherein the audio cluster identifier represents an ambient audio environment.

* * * * *